(12) United States Patent
Cachovan et al.

(10) Patent No.: US 11,810,228 B2
(45) Date of Patent: Nov. 7, 2023

(54) NETWORK DETERMINATION OF LIMITED-ANGLE RECONSTRUCTION

(71) Applicant: Siemens Medical Solutions USA, Inc., Malvern, PA (US)

(72) Inventors: Michal Cachovan, Erlangen (DE); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 17/754,481

(22) PCT Filed: Dec. 3, 2019

(86) PCT No.: PCT/US2019/064121
§ 371 (c)(1),
(2) Date: Apr. 4, 2022

(87) PCT Pub. No.: WO2021/112821
PCT Pub. Date: Jun. 10, 2021

(65) Prior Publication Data
US 2023/0162412 A1    May 25, 2023

(51) Int. Cl.
*G06T 11/00*    (2006.01)
(52) U.S. Cl.
CPC .. *G06T 11/008* (2013.01); *G06T 2207/20084* (2013.01); *G06T 2211/424* (2013.01)
(58) Field of Classification Search
CPC ....... A61B 6/037; A61B 6/4266; A61B 6/486; A61B 6/5217; A61B 6/5264; A61B 6/5288; G16H 50/30; G06T 2207/10104; G06T 2207/10108; G06T 7/20
See application file for complete search history.

(56) References Cited

U.S. PATENT DOCUMENTS

| | | | |
|---|---|---|---|
| 6,928,316 B2 | 8/2005 | Wright et al. | |
| 10,064,593 B2 | 9/2018 | Ma et al. | |
| 10,292,671 B2 | 5/2019 | Sanders et al. | |
| 10,303,849 B2 | 5/2019 | Cachovan et al. | |
| 10,395,353 B2 | 8/2019 | Rong et al. | |
| 2016/0093048 A1 | 3/2016 | Cheng et al. | |
| 2018/0061059 A1 | 3/2018 | Xu et al. | |
| 2018/0300907 A1* | 10/2018 | Ding | G06T 11/006 |
| 2018/0315223 A1 | 11/2018 | Vija et al. | |

(Continued)

FOREIGN PATENT DOCUMENTS

WO    2018011631 A2    1/2018

OTHER PUBLICATIONS

International Search Report for corresponding application No. PCT/US2019/064121, dated Dec. 3, 2019.
(Continued)

*Primary Examiner* — Ming Wu

(57) ABSTRACT

A system and method include training of an artificial neural network to generate an output three-dimensional image volume based on input two-dimensional projection images, the training based on a plurality of subsets of two-dimensional projection images of each of a plurality of sets of two-dimensional projection images and associated ones of three-dimensional image volumes reconstructed from each of the plurality of sets of two-dimensional projection images.

14 Claims, 13 Drawing Sheets

(56) References Cited

U.S. PATENT DOCUMENTS

2020/0074712 A1* 3/2020 Wu ................. G06V 10/25
2020/0258243 A1* 8/2020 Chang ............... A61B 5/107
2020/0380779 A1* 12/2020 Khazov .............. G06T 7/75

OTHER PUBLICATIONS

Vija, et al., Quantitative SPECT for Time Activity Curve Estimation Using Extra Modal Information for the Theranostics Application, Prior Art Journal 2016, vol. 19, DOI 10.18169/PAPDEOTT005723.

Würfl, Tobias, et al. "Deep learning computed tomography." Medical Image Computing and Computer-Assisted Intervention—MICCAI 2016: 19th International Conference, Athens, Greece, Oct. 17-21, 2016, Proceedings, Part III 19. Springer International Publishing, 2016.

Liu, Chih-Chieh, and Hsuan-Ming Huang. "Partial-ring PET image restoration using a deep learning based method." Physics in Medicine & Biology 64.22 (2019): 225014.

Zhou, Bo, Xunyu Lin, and Brendan Eck. "Limited angle tomography reconstruction: synthetic reconstruction via unsupervised sinogram adaptation." Information Processing in Medical Imaging: 26th International Conference, IPMI 2019, Hong Kong, China, Jun. 2-7, 2019, Proceedings 26. Springer International Publishing, 2019.

\* cited by examiner

NETWORK DETERMINATION OF LIMITED-ANGLE RECONSTRUCTION

BACKGROUND

Conventional medical images may be generated via transmission tomography imaging or emission tomography imaging. In transmission tomography imaging, the imaging source (e.g., an X-ray source) is external to the subject and the source radiation (e.g., X-rays) is transmitted through the subject to a detector. According to emission tomography imaging, the imaging source (e.g., a gamma ray-emitting radiopharmaceutical) is internal to the subject (e.g., due to injection or ingestion thereof) and the source radiation (e.g., gamma rays) is emitted from within the subject to a detector. In either case, absorption or scattering within the subject tissue attenuates the source radiation prior to reception of the source radiation by the detector.

In some applications an emission imaging system is unable to acquire a full set (e.g., a full rotation) of tomographic information in the time needed to adequately image biological/physiological processes of interest. Current practice in these applications is to perform planar imaging over a full rotation around the subject at a rate faster than sufficient data for each position can be acquired. Such images lack spatial and location information related to tracer uptake, and may therefore result in incorrect quantitative measures and/or artifacts.

Emission tomography imaging typically exhibits lower resolution, greater artifacts and a more-pronounced partial volume effect in comparison to transmission tomography imaging. Current techniques for improving tomographic reconstruction of emission data utilize supplemental data obtained using other imaging modalities (e.g., Computed Tomography (CT), Magnetic Resonance (MR)). The supplemental data may be obtained by segmenting the CT/MR image data to, for example, identify tissue locations and characteristics. This information may facilitate corrections for resolution, partial volume effect and attenuation.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide generation of an image volume from an incomplete set of projection images. For example, embodiments may generate a high-resolution reconstructed volume based on a set of PET images taken from a limited set of projections angles. Generation of the volume may be informed by a CT scan acquired contemporaneously with the projection images.

Figure 1:
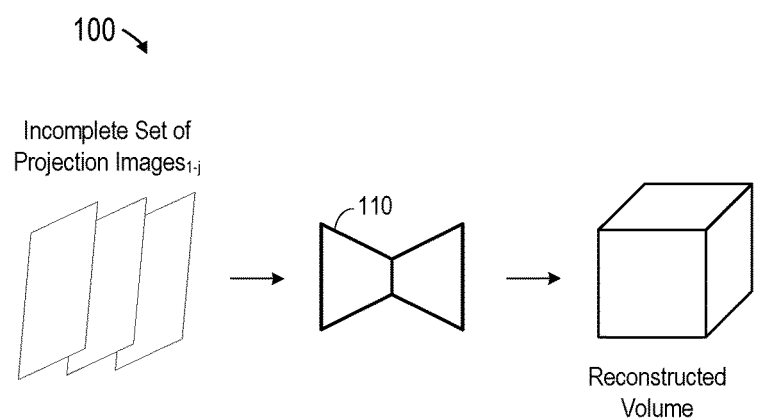
FIG. 1 is a block diagram of a system deploying a trained artificial neural network to generate an image volume from an incomplete set of projection images according to some embodiments.

FIG. 1 is a block diagram of a deployed system according to some embodiments. System 100 includes trained network 110. Training of network 110 according to some embodiments will be described below. Although depicted as a neural network, network 110 may comprise any type of processing system to implement a function resulting from the below-described training. For example, network 110 may comprise a software application programmed to implement a function generated via prior neural network training.

In operation, projection images$_{1-j}$ are acquired via a first imaging modality. For example, projection images$_{1-j}$ may be acquired by a PET or SPECT scanner after injection of a radioactive tracer into a subject volume (e.g., a patient or a phantom). Projection images$_{1-j}$ may be acquired at several different projection angles as is known in the art.

According to some embodiments, projection images$_{1-j}$ are "incomplete", in that the projection angles represented by the projection images are insufficient to generate a satisfactory reconstructed image. For example, the projection angles at which projection images$_{1-j}$ are acquired may define an arc of less than 180 degrees.

Trained network 110 outputs a quantitative reconstructed volume based on the input images. According to some embodiments, trained artificial neural network 110 implements a function. The function may be characterized as a set of trained parameter values associated with various layers of network nodes. The function may be deployed as is known in the art to any computing device.

According to some embodiments, network 110 receives a three-dimensional volume reconstructed from incomplete projection images$_{1-j}$ and generates reconstructed volume therefrom. In such embodiments, and as will be described below, network 110 is trained using three-dimensional volumes reconstructed from incomplete projection images$_{1-j}$.

Figure 2:
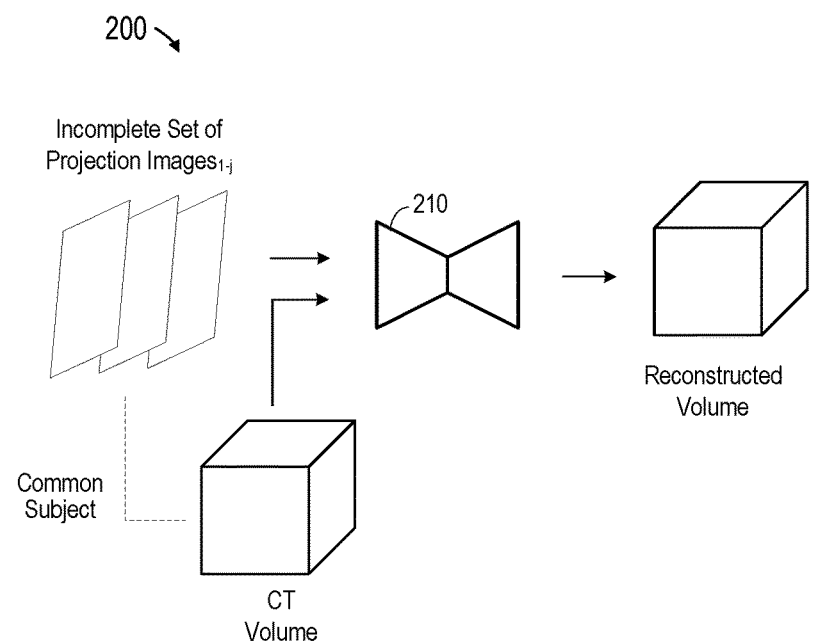
FIG. 2 is a block diagram of a system deploying a trained artificial neural network to generate an image volume from an incomplete set of projection images and a CT volume according to some embodiments.

FIG. 2 illustrates deployed system 200 according to some embodiments. Incomplete set of projection images$_{1-j}$ are input to trained network 210 as described above with respect to system 100. Also input to network 210 is a CT volume representing a same subject as imaged by projection images$_{1-j}$. The CT volume may be acquired contemporaneously with projection images$_{1-j}$ so as to reduce registration errors therebetween.

Trained network 210 generates a reconstructed volume based on the incomplete set of projection images$_{1-j}$ and the CT volume. The CT volume may improve the quality of the output reconstructed volume by providing attenuation information which is not present in the deployment illustrated in FIG. 1. Other structural imaging modalities may be substituted for CT to provide attenuation information, such as but not limited to MR and PET.

Figure 3:
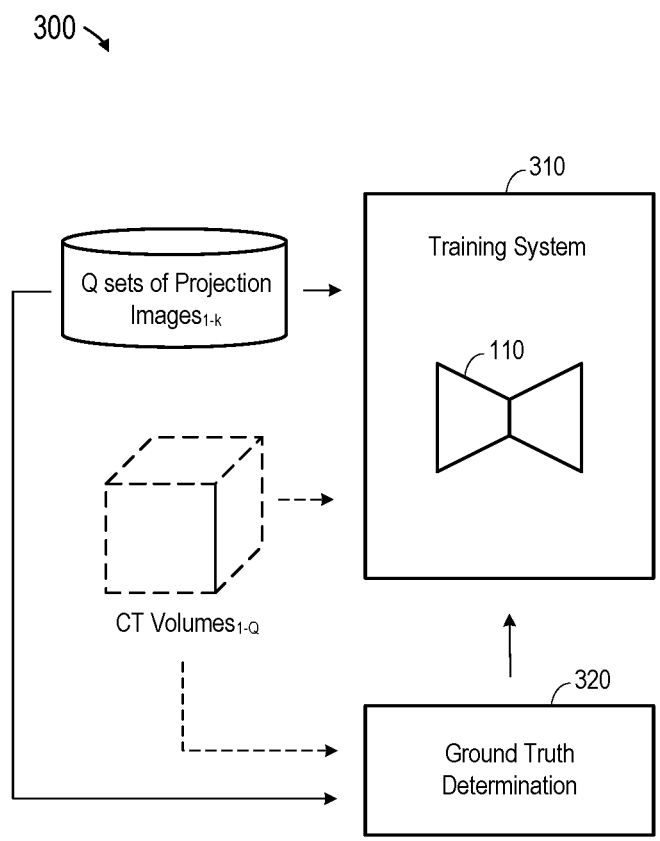
FIG. 3 is a block diagram of a system to train an artificial neural network to generate an image volume from an incomplete set of projection images according to some embodiments.

FIG. 3 illustrates architecture 300 for training network 110 to generate a volume based on an incomplete set of projection images according to some embodiments. Network 110 may be trained temporally and/or geographically distant from the deployments depicted in FIGS. 1 and 2. For example, architecture 300 may be implemented at a data processing facility while systems 100 or 200 may execute within an imaging theater in which a patient has just been imaged.

Training system 310 uses Q sets of projection images$_{1-k}$ and, in some embodiments, CT volumes$_{1-Q}$ to train artificial neural network 110. Q sets of projection images$_{1-k}$ and CT volumes$_{1-Q}$ are also used by ground truth determination unit 320 to generate ground truth data for evaluating the performance of network 110 during training by training system 310. For example, for a set X of Q sets of projection images$_{1-k}$, training system 310 generates a subset 1-$j$ and inputs the subset (and, in some embodiments, a CT volume corresponding to set X) to network 110 to generate a volume based thereon. The volume is then compared with a ground truth volume generated by unit 320 based on the full set X of projection images$_{1-k}$ (and on CT volume$_x$) using quantitative and iterative reconstruction methods. The process repeats for other subsets 1-$j$ of set X and also repeats for each other of the Q sets of projection images$_{1-k}$. Network 110 is modified based on the comparisons and the entire process repeats until satisfactory network performance is achieved.

Artificial neural network 110 may comprise any type of network which is trainable to approximate a function. In some embodiments, network 110 comprises an implementation of a "u-net" convolutional network architecture as is known in the art.

Generally, artificial neural network 110 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Artificial neural network 110 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

According to some embodiments, trained artificial neural network 110 implements a function of its inputs. The function may be characterized as a set of parameter values associated with each network node. The function may be deployed as is known in the art to an external system such as system 100 of FIG. 1. In one example, the training generates parameter values for kernels of a fully convolutional network. Another fully convolutional network comprising thusly-parameterized kernels may be efficiently incorporated within a system such as system 100 to generate a high-resolution volume as described herein.

Training system 310 may comprise any system or systems for training an artificial neural network that are or become known. For example, training system 310 may employ supervised learning, unsupervised learning and/or reinforcement learning.

The Q sets of projection images$_{1-k}$ and corresponding CT volumes$_{1-Q}$ may represent many different patients, phantoms, or other subjects. Moreover, each of the Q sets of projection images$_{1-k}$ and corresponding CT volumes$_{1-Q}$ may be acquired at different locations using different contrast settings. Generally, trained network 110 may be used to generate a volume based on input data of any modalities so long as those modalities were well-represented in the training data sets.

Figure 4:
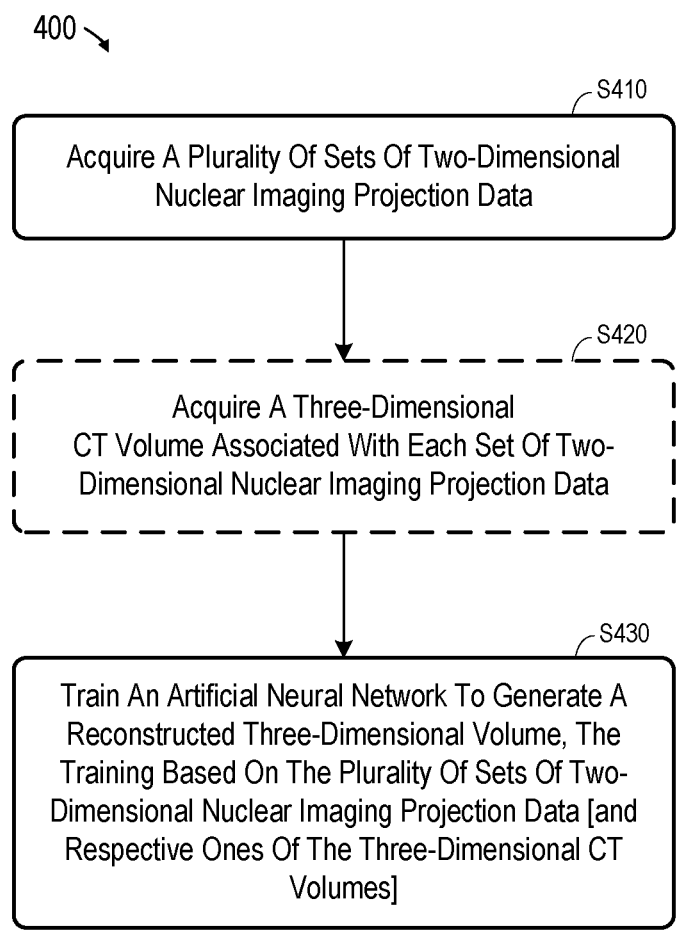
FIG. 4 is a flow diagram of a process to train an artificial neural network to generate an image volume from an incomplete set of projection images according to some embodiments.

FIG. 4 is a flow diagram of a network training process according to some embodiments. Process 400 and the other processes described herein may be performed using any suitable combination of hardware and software. Software program code embodying these processes may be stored by any non-transitory tangible medium, including but not limited to a fixed disk, a volatile or non-volatile random access memory, a DVD, a Flash drive, or a magnetic tape. Embodiments are not limited to the examples described below.

Initially, at S410, a plurality of sets of two-dimensional projection data are acquired. The projection images may be acquired via a nuclear imaging scan and/or any other imaging modality that is or becomes known. Optionally, at S420, a three-dimensional CT volume associated with each set of two-dimensional projection data is acquired. According to some embodiments, each CT volume was acquired substantially contemporaneously with its associated set of projection data as is known in the art. S410 and S420 may simply comprise accessing a large repository of previously-acquired imaging data.

An artificial neural network is trained at S430 based on the data acquired at S410 and S420. The artificial neural network is trained to generate a reconstructed three-dimensional volume, based on the plurality of sets of two-dimensional projection data and, optionally, on respective ones of the three-dimensional CT volumes. In some embodiments, training of the network involves determining a loss based on the output of the network and iteratively modifying the network based on the loss until the loss reaches an acceptable level or training otherwise terminates (e.g., due to time constraints or to the loss asymptotically approaching a lower bound). Training of the network at S430 may occur well after and separate from acquisition of the training data. For example, the training data may be acquired and accumulated in an image repository over several months or years prior to execution of S430.

Figure 5:
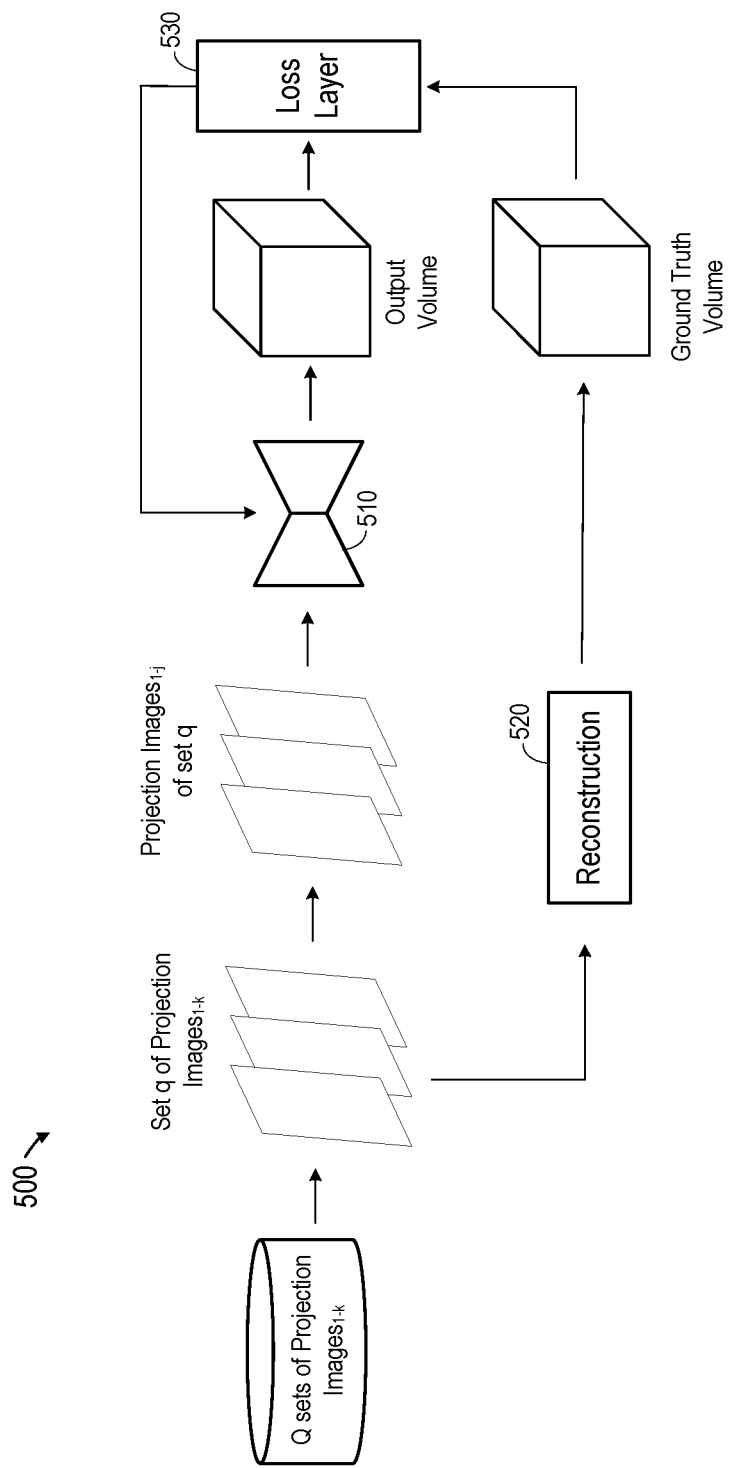
FIG. 5 is a block diagram of an artificial neural network training architecture according to some embodiments.

FIG. 5 illustrates training, by training architecture 500, at S430 according to some embodiments. During training, reconstruction component 520 generates a ground-truth volume for each of Q sets of projection images$_{1-k}$ acquired at S410. Reconstruction component 520 may apply conjugate gradient, attenuation and scatter (CGAS) reconstruction, filtered back-projection (FBP) reconstruction or any other suitable technique to projection images$_{1-4}$. Subsets of each of the Q sets are input to network 510 and, in response, network 510 outputs a volume corresponding to each subset. According to some embodiments, a three-dimensional volume may be reconstructed from each subset and input to network 510 instead of or in addition to the input of each subset.

Loss layer component 530 determines a loss by comparing each output volume to a corresponding ground truth volume. More specifically, an output volume based upon a particular subset of a set of projection images is compared against a volume reconstructed by component 520 based on the same set of projection images. Any number of subsets of a particular set of projection images may be used during training at S430.

The total loss is back-propagated from loss layer component 530 to network 510. The loss may comprise an L1 loss, and L2 loss, or any other suitable measure of total loss. An L1 loss is the sum of the absolute differences between each output volume and its corresponding ground truth volume, and an L2 loss is the sum of the squared differences between each output volume and its corresponding ground truth volume.

Network 510 changes its internal weights, or kernel parameter values, based on the back-propagated loss as is known in the art. The training data is again processed by network 510 and loss layer 530 as described above, and the process repeats, until it is determined that the loss has reached an acceptable level or training otherwise terminates. At termination, network 510 may be considered trained. In some embodiments, the function implemented by now-trained network 510 (e.g., embodied in parameter values of trained convolutional kernels) may then be deployed as shown in FIG. 1.

Figure 6:
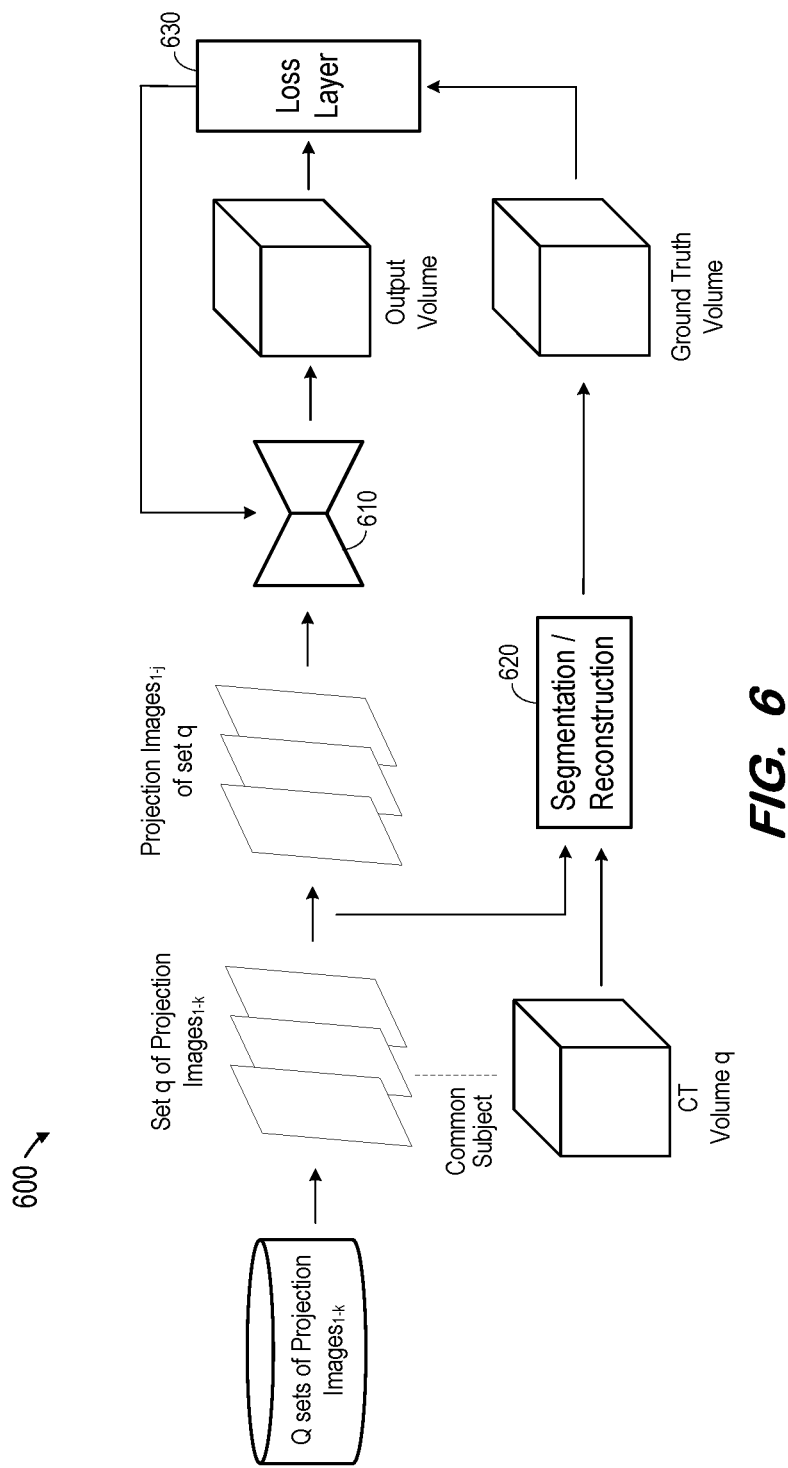
FIG. 6 is a block diagram of an artificial neural network training architecture according to some embodiments.

FIG. 6 illustrates training at S430 according to some embodiments. Training architecture 600 may be used to train network 610 for deployment in an architecture such as architecture 200 of FIG. 2. Similar to training architecture 500, reconstruction component 620 generates a ground-truth volume for each of Q sets of projection images$_{1-k}$ acquired at S410. However, for each of the Q sets of projection images$_{1-k}$, component 620 also uses a corresponding CT volume q to generate the associated ground truth volume. Structural image volumes other than CT may be employed, including but not limited to MR and PET. According to some embodiments, component 620 generates each ground truth volume q by segmenting and registering a corresponding CT volume q as is known in the art, and executing multi-modal reconstruction based thereon and on a corresponding set of projection images$_{1-k}$.

During training, subsets of each of the Q sets are input to network 610, which outputs a volume corresponding to each subset. Any number of subsets of a particular set of projection images, including any number of projection images, may be used during. Again, a three-dimensional volume may be reconstructed from each subset and input to network 610 instead of or in addition to the input of each subset.

Loss layer component 630 may determine a loss by comparing each output volume to a corresponding ground truth volume as described above, and network 610 is modified until it is determined that the loss has reached an acceptable level or training otherwise terminates. The function implemented by now-trained network 160 may then be deployed, for example, as shown in FIG. 2.

Reconstruction component 420, segmentation/reconstruction component 620, and each functional component described herein may be implemented in computer hardware, in program code and/or in one or more computing systems executing such program code as is known in the art. Such a computing system may include one or more processing units which execute processor-executable program code stored in a memory system. Moreover, networks 510 and 610 may comprise hardware and software specifically-intended for executing algorithms based on a specified network architecture and trained kernel parameters.

Figure 7:
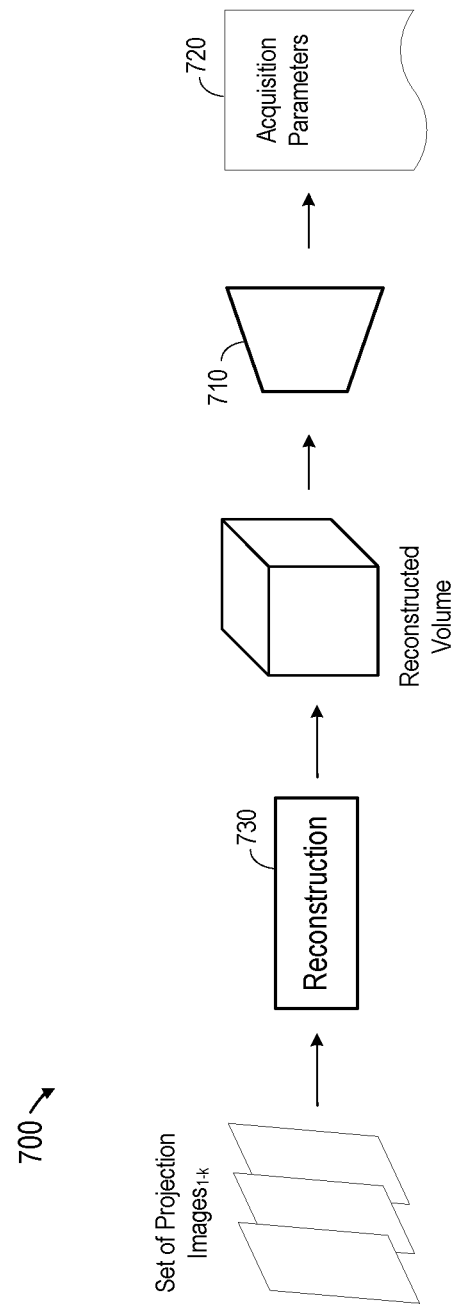
FIG. 7 is a block diagram of a system deploying a trained artificial neural network to generate acquisition parameters from a set of projection images according to some embodiments.

FIG. 7 is a block diagram of system 700 deploying a trained artificial neural network 710 to generate image acquisition parameters 720 from a set of projection images according to some embodiments. Training of network 710 according to some embodiments will be described below. Although depicted as a classification-type neural network, network 710 may comprise any type of processing system to implement a learned function and output one or more image acquisition parameters (e.g., a probability associated with each of one or more acquisition parameters). For example, network 710 may comprise a software application programmed to implement a function generated via prior neural network training.

In operation, a set of projection images$_{1-k}$ are acquired via a suitable imaging modality. For example, projection images$_{1-k}$ may be acquired by a PET or SPECT scanner after injection of a radioactive tracer into a subject volume. Projection images$_{1-k}$ may comprise CT images as is known in the art.

The set of projection images$_{1-k}$ is used by reconstruction component 730 to reconstruct a volume as is known in the art. The reconstruction technique applied by reconstruction component 730 may depend upon the type of modality used to acquire the set of projection images$_{1-k}$. Embodiments of reconstruction component 730 may employ any suitable reconstruction algorithm.

Trained network 710 receives the reconstructed volume and outputs an indication of acquisition parameters 720. Acquisition parameters 720 may comprise acquisition parameters which address deficiencies in projection images$_{1-k}$ and therefore result in a higher-quality reconstructed volume. Therefore, in some embodiments, trained network 710 models correlations between undesirable characteristics of a reconstructed volume and parameters for acquiring projection images which may be used to reconstruct a volume that exhibits a reduction in the undesirable characteristics.

Accordingly, in some examples, a first set of projection images$_{1-k}$ is acquired and reconstruction component 730 reconstructs a first volume therefrom. The first volume is input to network 710 and network 710 outputs acquisition parameters 720. A second set of projection images is acquired based on the output acquisition parameters 720 and a second volume is reconstructed from the second set of projection images. The second volume exhibits improved characteristics with respect to the first volume.

The characteristics which are improved depend upon the data used to train network 710. Moreover, "improvement" of the characteristics is relative to the desired usage of the resulting reconstructed volumes. For example, a high level of a particular image characteristic may be desirable for one type of diagnostic review, while a low level of the particular image characteristic may be desirable for treatment planning. In the former case, "improving" the particular image characteristic consists of increasing the level of the image characteristic and, in the latter case, the particular image characteristic is improved by decreasing the level of the image characteristic.

Figure 8:
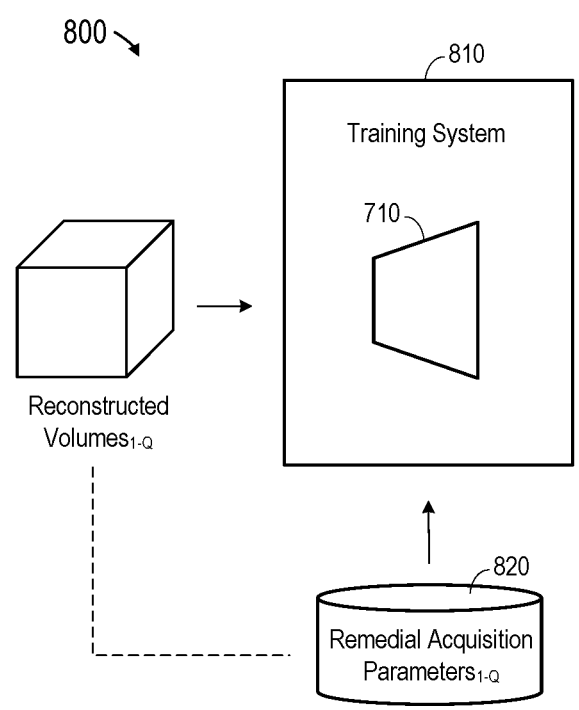
FIG. 8 is a block diagram of a system to train an artificial neural network to generate acquisition parameters according to some embodiments.

FIG. 8 is a block diagram of system 800 to train artificial neural network 710 to generate acquisition parameters according to some embodiments. Training system 810 uses reconstructed volumes$_{1\text{-}Q}$ and remedial acquisition parameters$_{1\text{-}Q}$ to train artificial neural network 710. Each of reconstructed volumes$_{1\text{-}Q}$ is associated with a respective one of remedial acquisition parameters$_{1\text{-}Q}$.

In some embodiments, the remedial acquisition parameters which are associated with a given training volume are parameters for projection image acquisition which may address deficiencies in the given training volume. These parameters may be defined by a human upon review of the given training volume. The remedial acquisition parameters may include any parameters related to the imaging modality used to acquire projection images that are or become known. For example, in the case of SPECT imaging, remedial acquisition parameters 820 may include the duration of each projection, the number of frames per projection, the number of projections per scan, and the size of acquisition matrix. In the case of CT imaging, remedial acquisition parameters 820 may include X-ray beam energy, X-ray tube current, integration time, frames per projection, and acquisition time.

During training of system 710, reconstructed volumes$_{1\text{-}Q}$ are input to training system 810, which outputs a set of acquisition parameters for each of reconstructed volumes$_{1\text{-}Q}$. As mentioned above, an output set of acquisition parameters may comprise a set of probabilities for each of several possible acquisition parameters. Training system 810 compares each output set of acquisition parameters with a corresponding set of remedial acquisition parameters stored among parameters 820. A total loss is computed and network 710 is modified based on the loss. The training process repeats until satisfactory network performance is achieved.

Figure 9:
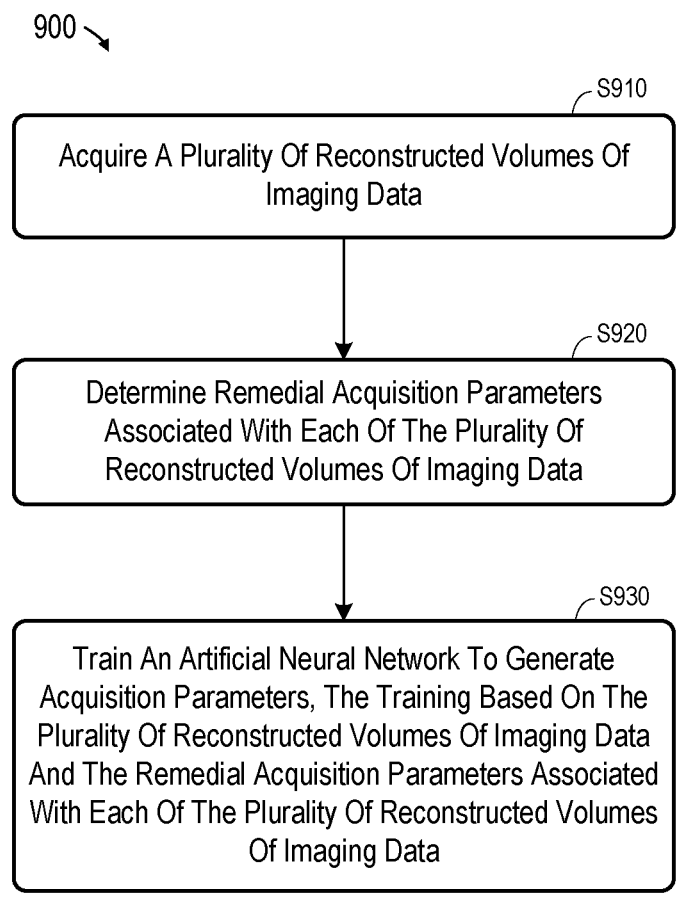
FIG. 9 is a flow diagram of a process to train an artificial neural network to generate acquisition parameters according to some embodiments.

FIG. 9 is a flow diagram of process 900 to train an artificial neural network to generate acquisition parameters according to some embodiments. At S910, a plurality of reconstructed volumes of imaging data are acquired. The volumes may be reconstructed from projection images as is known in the art. S910 may comprise accessing a repository of reconstructed three-dimensional image data.

Remedial acquisition parameters associated with each of the reconstructed volumes are determined at S920. Remedial acquisition parameters which are associated with a given volume are projection image acquisition parameters which may address deficiencies in the given volume if used to acquire projection images for subsequent reconstruction. A radiologist may review each reconstructed volume in order to determine remedial acquisition parameters associated with the reconstructed volumes.

An artificial neural network is trained at S930 based on the acquired volumes and determined remedial acquisition parameters. In some embodiments, training of the network involves determining a loss based on the output of the network and iteratively modifying the network based on the loss until the loss reaches an acceptable level or training otherwise terminates (e.g., due to time constraints or to the loss asymptotically approaching a lower bound). Training of the network at S930 may occur well after and separate from acquisition of the training data at S910 and S920.

Figure 10:
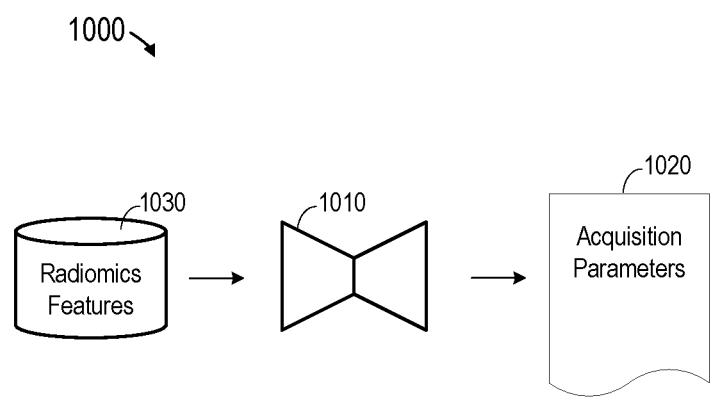
FIG. 10 is a block diagram of a system deploying a trained artificial neural network to generate acquisition parameters from radiomics features according to some embodiments.

FIG. 10 is a block diagram of system 1000 deploying trained artificial neural network 1010 to generate acquisition parameters 1020 from radiomics features 1030 according to some embodiments. Network 1010 may comprise any type of processing system to implement a learned function and output image acquisition parameters 1020 (e.g., a probability associated with each of one or more acquisition parameters).

Radiomics refers to the extraction of features from radiographic medical images. The extraction is based on programmed and/or learned algorithms, and the features may provide insight to diagnosis, prognosis and therapeutic response which might not be appreciated by the naked eye.

Radiomics features 1030 of system 1000 may be acquired in any manner that is or becomes known. According to some embodiments, radiomic features 1030 may include size and shape-based features, descriptors of an image intensity histogram, descriptors of the relationships between image voxels (e.g., gray-level co-occurrence matrix (GLCM), run length matrix (RLM), size zone matrix (SZM), and neighborhood gray tone difference matrix (NGTDM)) derived textures, textures extracted from filtered images, and fractal features.

In operation, radiomics features 1030 are acquired based on one or more images of a subject. In some embodiments, a set of projection images is acquired and a volume is reconstructed therefrom, and radiomics features 1030 are extracted from the volume. Trained network 1010 receives the radiomics features and outputs acquisition parameters 1020. The output acquisition parameters 1020 may comprise acquisition parameters which address deficiencies in the image(s) from which radiomics features 1030 were extracted.

Therefore, in some embodiments, a first set of projection images is acquired and a volume is reconstructed therefrom. The volume is input to network 1010 and network 1010 outputs acquisition parameters 1020. A second set of projection images is then acquired based on the output acquisition parameters 1020 and a second volume is reconstructed from the second set of projection images. Due to the use of the output acquisition parameters 1020 to acquire the second set of projection images, the second volume exhibits improved characteristics with respect to the first volume. As mentioned above, the characteristics which are improved and the manner in which the characteristics are improved depend upon the data used to train network 1010.

Figure 11:
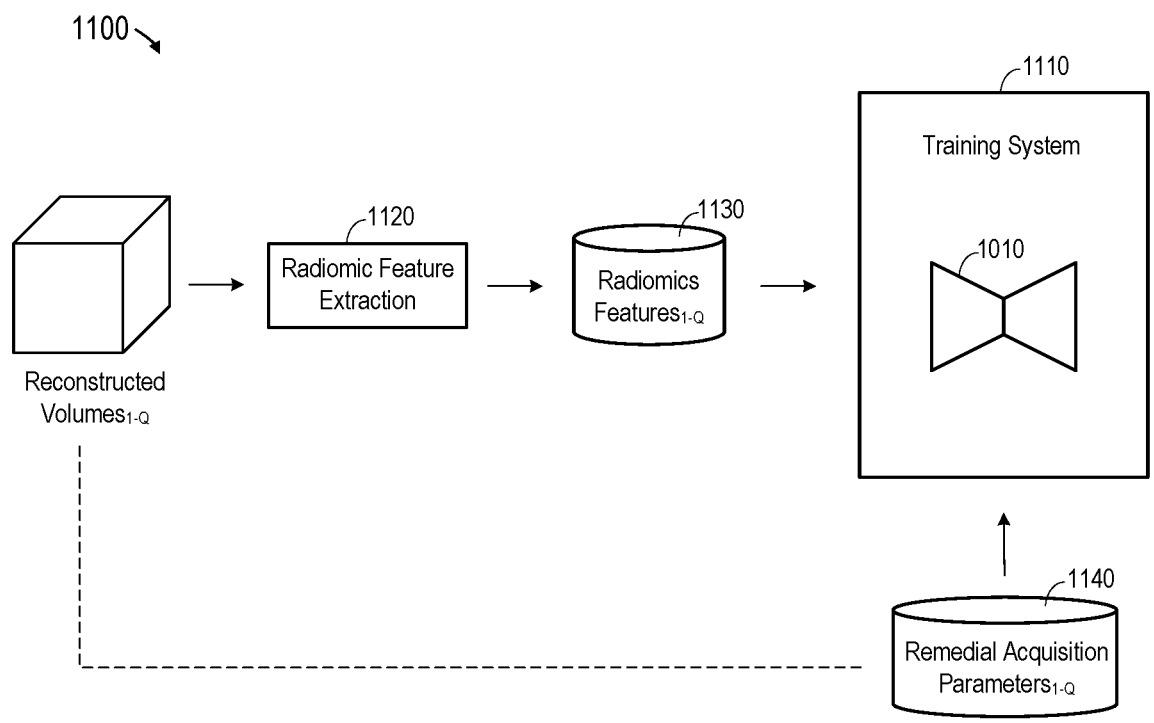
FIG. 11 is a block diagram of a system to train an artificial neural network to generate acquisition parameters from radiomics features according to some embodiments.

FIG. 11 is a block diagram of system 1100 to train artificial neural network 1010 to generate acquisition parameters according to some embodiments. Training system 1110 uses sets of radiomics features$_{1\text{-}Q}$ 1130 and remedial acquisition parameters$_{1\text{-}Q}$ 1140 to train artificial neural network 1010. Each set of radiomics features$_{1\text{-}Q}$ 1130 is extracted from a respective one of reconstructed volumes$_{1\text{-}3\ Q}$ by radiomic feature extraction component 1120 as is or becomes known. Each set of radiomics features$_{1\text{-}Q}$ 1130 is associated with a respective one of remedial acquisition parameters$_{1\text{-}Q}$ 1140 which corresponds to the reconstructed volume from which the set of radiomics features was extracted. In other words, the remedial acquisition parameters which are associated with a given set of radiomics features are parameters for projection image acquisition which may address deficiencies in an image volume from which the given set of radiomics features was extracted. Remedial acquisition parameters$_{1\text{-}Q}$ 1140 may comprise any parameters described herein or otherwise known.

Figure 12:
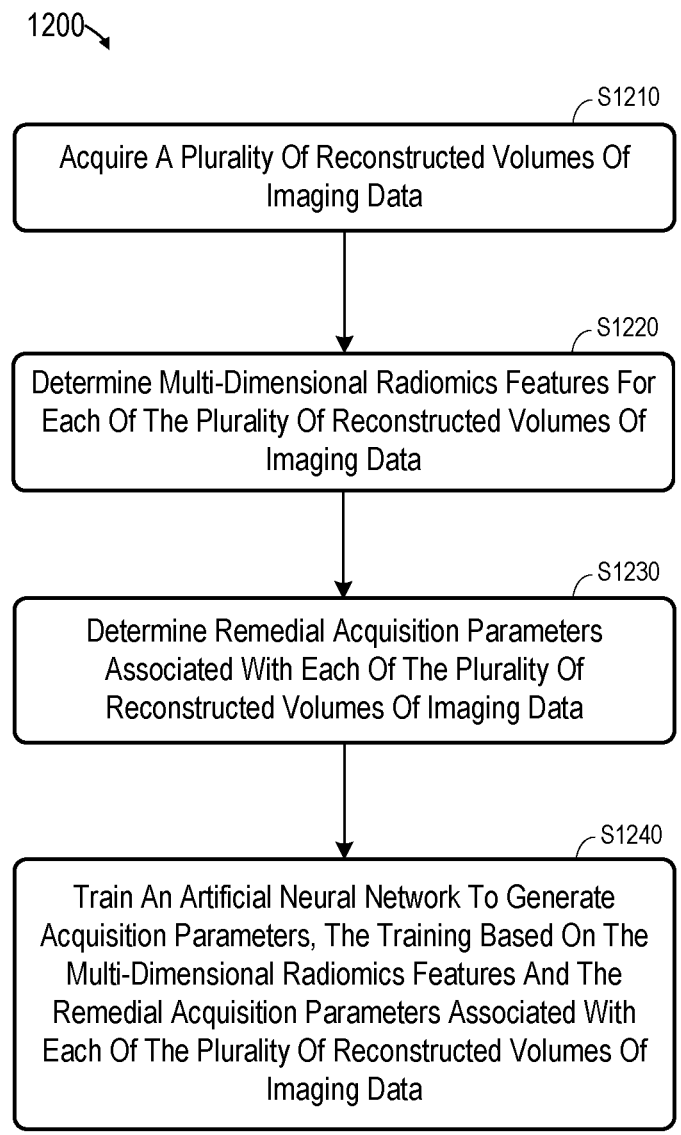
FIG. 12 is a flow diagram of a process to train an artificial neural network to generate acquisition parameters from radiomics features according to some embodiments.

FIG. 12 is a flow diagram of process 1200 to train an artificial neural network to generate acquisition parameters according to some embodiments. Process 1200 will be described below with respect to system 1100, but embodiments are not limited thereto. At S1210, a plurality of reconstructed volumes of imaging data are acquired. The volumes may be reconstructed from projection images as is known in the art. In some embodiments, S1210 comprises accessing a repository of reconstructed three-dimensional image data.

Next, at S1220, multi-dimensional radiomics features are determined for each of the plurality of reconstructed volumes of image data. For example, radiomic feature extraction component 1120 may extract radiomics features$_{1-Q}$ 1130 from respective ones of reconstructed volumes$_{1-3\ Q}$ at S1220 as is or becomes known.

Remedial acquisition parameters associated with each of the reconstructed volumes are determined at S1230. The remedial acquisition parameters may be determined via human review. For example, a radiologist may review each reconstructed volume in order to determine acquisition parameters which may remedy deficiencies in the volumes if used to acquire projection images for subsequent reconstruction.

An artificial neural network is trained at S1240 based on the multi-dimensional radiomics features and determined remedial acquisition parameters. In some embodiments, training of the network involves inputting the multi-dimensional radiomics features to training system 1110, which outputs a set of acquisition parameters for each set of radiomics features$_{1-Q}$. An output set of acquisition parameters may comprise a set of probabilities for each of several possible acquisition parameters. Training system 1110 compares each output set of acquisition parameters with a corresponding set of remedial acquisition parameters stored among parameters 1140. A total loss is computed and network 1010 is modified based on the loss. The training process repeats until satisfactory network performance is achieved.

Figure 13:
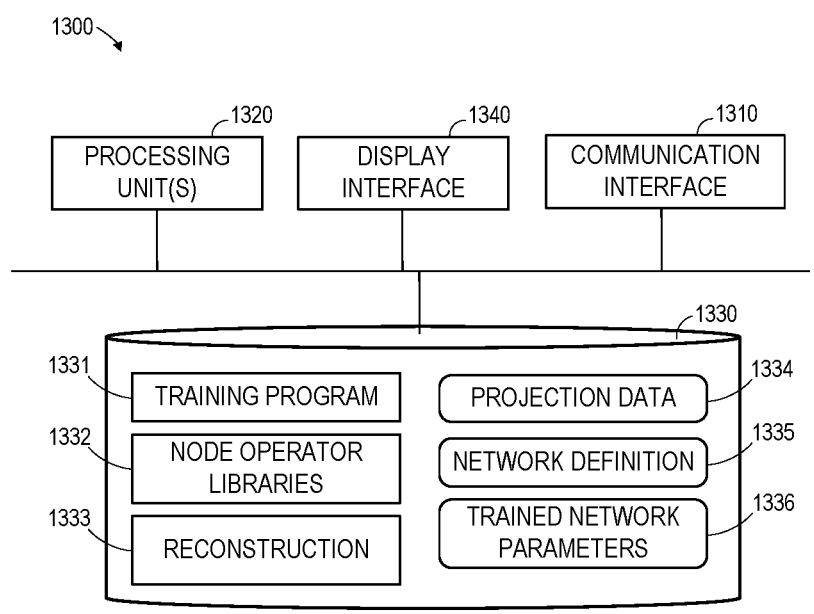
FIG. 13 is a block diagram of a computing system to train an artificial neural network to generate an image volume from an incomplete set of projection images.

FIG. 13 is a block diagram of a computing system to train an artificial neural network to generate an image volume from an incomplete set of projection images according to some embodiments. System 1300 may comprise a computing system to facilitate the design and training of an artificial neural network as is known in the art. Computing system 1300 may comprise a standalone system, or one or more elements of computing system 1300 may be located in the cloud.

System 1300 includes communication interface 1310 to communicate with external devices via, e.g., a network connection. Processing unit(s) 1320 may comprise one or more processors, processor cores, or other processing units to execute processor-executable process steps. In this regard, storage system 1330, which may comprise one or more memory devices (e.g., a hard disk drive, a solid-state drive), stores processor-executable process steps of training program 1331 which may be executed by processing unit(s) 1330 to train a network as described herein.

Training program 1331 may utilize node operator libraries 1332, which includes code to execute various operations associated with node operations. According to some embodiments, computing system 1300 provides interfaces and development software (not shown) to enable development of training program 1331 and generation of network definition 1335 which specifies the architecture of the neural network to be trained. Storage device 1330 may also include program code 1333 of reconstruction component 520 and/or segmentation/reconstruction component 620.

Data used for training the network may also be stored in storage device 1330, including but not limited to projection data 1334 as described with respect to FIG. 5. Once trained, the parameters of the neural network may be stored as trained network parameters 1336. As mentioned above, these trained parameters may be deployed in other systems as is known in the art to provide the trained functionality.

Figure 14:
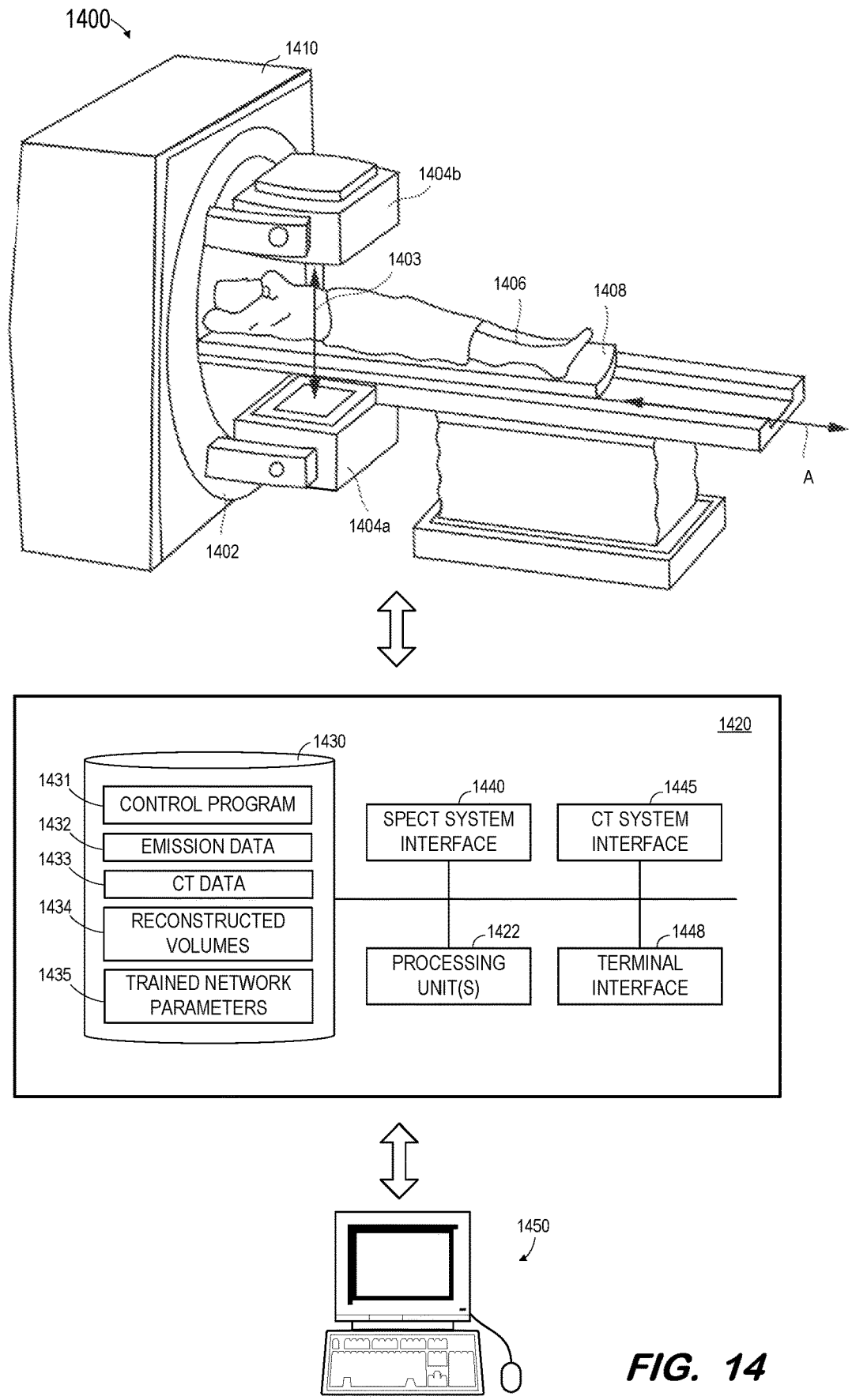
FIG. 14 illustrates a dual transmission and emission imaging SPECT/CT system deploying a trained neural network according to some embodiments.

FIG. 14 illustrates SPECT-CT system 1400 which may deploy a trained network to generate high-resolution volumes based on CT data and lower-resolution nuclear imaging data as described herein.

System 1400 includes gantry 1402 to which two or more gamma cameras 1404a, 1404b are attached, although any number of gamma cameras can be used. A detector within each gamma camera detects gamma photons (i.e., emission data) 1403 emitted by a radioisotope within the body of a patient 1406 lying on a bed 1408.

Bed 1408 is slidable along axis-of-motion A. At respective bed positions (i.e., imaging positions), a portion of the body of patient 1406 is positioned between gamma cameras 1404a, 1404b in order to capture emission data 1403 from that body portion. Gamma cameras 1404a, 1404b may include multi-focal cone-beam collimators or parallel-hole collimators as is known in the art.

System 1400 also includes CT housing 1410 including an X-ray imaging system (unshown) as is known in the art. Generally, and according to some embodiments, the X-ray imaging system acquires two-dimensional X-ray images of patient 1406 before, during and/or after acquisition of emission data using gamma cameras 1404a and 1404b.

Control system 1420 may comprise any general-purpose or dedicated computing system. Accordingly, control system 1420 includes one or more processing units 1422 configured to execute processor-executable program code to cause system 1420 to operate as described herein, and storage device 1430 for storing the program code. Storage device 1430 may comprise one or more fixed disks, solid-state random access memory, and/or removable media (e.g., a thumb drive) mounted in a corresponding interface (e.g., a USB port).

Storage device 1430 stores program code of system control program 1431. One or more processing units 1422 may execute system control program 1431 to, in conjunction with SPECT system interface 1440, control motors, servos, and encoders to cause gamma cameras 1404a, 1404b to rotate along gantry 1402 and to acquire two-dimensional emission data 1403 at defined imaging positions during the rotation. The acquired data 1432 may comprise projection images as described herein and may be stored in memory 1430. Reconstructed volumes 1434 as described herein may be stored in memory 1430.

One or more processing units 1422 may also execute system control program 1431 to, in conjunction with CT system interface 1445, cause a radiation source within CT housing 1410 to emit radiation toward body 1406 from different projection angles, to control a corresponding detector to acquire two-dimensional CT images, and to reconstruct three-dimensional CT images from the acquired images. The CT images may be acquired substantially contemporaneously with the emission data as described above, and volumes reconstructed therefrom reconstructed images may be stored as CT data 1433.

Trained network parameters 1435 may comprise parameters of a neural network trained as described herein. For example, projection images of emission data 1432 and, optionally, a corresponding CT volume, may be input to a network implementing trained network parameters 1435 to generate remedial acquisition parameters as described above.

Terminal 1450 may comprise a display device and an input device coupled to system 1420. Terminal 1450 may display any of projection images, reconstructed volumes, and remedial acquisition parameters, and may receive user input for controlling display of the data, operation of imaging system 1400, and/or the processing described herein. In some embodiments, terminal 1450 is a separate computing device such as, but not limited to, a desktop computer, a laptop computer, a tablet computer, and a smartphone.

Each of component of system 1400 may include other elements which are necessary for the operation thereof, as well as additional elements for providing functions other than those described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a storage device;
   a processor to execute processor-executable process steps stored on the storage device to cause the system to:
   determine a plurality of sets of two-dimensional projection images, where each set of two-dimensional projection images includes two-dimensional projection images acquired from a plurality of projection angles;
   from each of the plurality of sets of two-dimensional projection images, reconstruct an associated three-dimensional image volume;
   from each of the plurality of sets of two-dimensional projection images, determine an associated subset of two-dimensional projection images, wherein a number of projection angles from which a given subset of two-dimensional projection images were acquired is less than a number of projection angles from which a given set of two-dimensional projection images associated with the given subset were acquired; and
   train an artificial neural network to generate an output three-dimensional image volume based on input two-dimensional projection images, the training based on the subsets of two-dimensional projection images and the reconstructed three-dimensional image volumes.

2. A system according to claim 1, wherein the artificial neural network is a convolutional network, and wherein the processor is to execute processor-executable process steps to cause the system to:
   output trained kernels of the trained network to an imaging system.

3. A system according to claim 2, further comprising the imaging system, the imaging system to:
   acquire a set of two-dimensional emission data;
   input the set of two-dimensional emission data to a second convolutional network comprising the trained kernels; and
   store a first simulated reconstructed three-dimensional volume generated by the second convolutional network based on the input set of two-dimensional emission data.

4. A system according to claim 1, the processor to execute processor-executable process steps stored on the storage device to cause the system to:
   determine a structural image volume associated with each of the plurality of sets of two-dimensional projection images,
   wherein reconstruction of a three-dimensional image volume based on one of the plurality of sets of two-dimensional projection images comprises reconstruction based on the one of the plurality of sets of two-dimensional projection images and on a structural image volume associated with the one of the plurality of sets of two-dimensional projection images.

5. A system according to claim 4, wherein reconstruction of the three-dimensional image volume comprises segmentation of the structural image volume.

6. A method comprising:
   determining a plurality of sets of two-dimensional projection images, where each set of two-dimensional projection images includes two-dimensional projection images acquired from a plurality of projection angles;
   from each of the plurality of sets of two-dimensional projection images, reconstructing a three-dimensional image volume;
   from each of the plurality of sets of two-dimensional projection images, determining an associated subset of two-dimensional projection images, wherein a number of projection angles from which a given subset of two-dimensional projection images were acquired is less than a number of projection angles form which a given set of two-dimensional projection images associated with the given subset were acquired; and
   training an artificial neural network to generate an output three-dimensional image volume based on input two-dimensional projection images, the training based on the subsets of two-dimensional projection images and the reconstructed three-dimensional image volumes.

7. A method according to claim 6, wherein the artificial neural network is a convolutional network, and further comprising:
   output trained kernels of the trained network to an imaging system.

8. A method according to claim 7, further comprising operating the imaging system to:
   acquire a set of two-dimensional emission data;
   input the set of two-dimensional emission data to a second convolutional network comprising the trained kernels; and
   store a first simulated reconstructed three-dimensional volume generated by the second convolutional network based on the input set of two-dimensional emission data.

9. A method according to claim 6, further comprising:
   determining a structural image volume associated with each of the plurality of sets of two-dimensional projection images,
   wherein reconstructing a three-dimensional image volume based on one of the plurality of sets of two-dimensional projection images comprises reconstructing the three-dimensional image volume based on the one of the plurality of sets of two-dimensional projection images and on a structural image volume associated with the one of the plurality of sets of two-dimensional projection images.

10. A method according to claim 9, wherein reconstructing the three-dimensional image volume comprises segmenting the structural image volume.

11. A system comprising:
    a storage device storing:
    a plurality of sets of two-dimensional projection images, where each set of two-dimensional projection images includes two-dimensional projection images acquired from a plurality of projection angles;
    a three-dimensional image volumes reconstructed from each of the plurality of sets of two-dimensional projection images; and
    nodes of an artificial neural network; and
    a processor to execute processor-executable process steps stored on the storage device to cause the system to:

from each of the plurality of sets of two-dimensional projection images, determine an associated subset of two-dimensional projection images, wherein a number of projection angles from which a given subset of two-dimensional projection images were acquired is less than a number of projection angles from which a given set of two-dimensional projection images associated with the given subset were acquired; and train the artificial neural network to generate an output three-dimensional image volume based on input two-dimensional projection images, the training based on the subsets of two-dimensional projection images and the three-dimensional image volumes reconstructed from each of the plurality of sets of two-dimensional projection images.

12. A system according to claim 11, wherein the artificial neural network is a convolutional network, and wherein the processor is to execute processor-executable process steps to cause the system to:

output trained kernels of the trained network to an imaging system.

13. A system according to claim 12, further comprising the imaging system, the imaging system to:

acquire a set of two-dimensional emission data;

input the set of two-dimensional emission data to a second convolutional network comprising the trained kernels; and store a first simulated reconstructed three-dimensional volume generated by the second convolutional network based on the input set of two-dimensional emission data.

14. A system according to claim 11, wherein the storage device stores a structural image volume associated with each of the plurality of sets of two-dimensional projection images, and wherein reconstructing a three-dimensional image volume based on one of the plurality of sets of two-dimensional projection images comprises reconstructing the three-dimensional image based on the one of the plurality of sets of two-dimensional projection images and on a structural images.

* * * * *